United States Patent
Tubbax et al.

(10) Patent No.: US 7,313,203 B2
(45) Date of Patent: Dec. 25, 2007

(54) METHOD AND SYSTEM FOR ESTIMATING AND COMPENSATING IQ IMBALANCE

(75) Inventors: Jan Tubbax, Meldert (BE); Marc Moonen, Herent-Winksele (BE); Hideki Minami, Atsugi (JP)

(73) Assignees: Interuniversitair Microelektronica Centrum (IMEC), Leuven (BE); Katholeike Universiteit Leuven, Leuven (BE); Sony Corp., Tokyo (JP)

(*) Notice: Subject to any disclaimer, the term of this patent is extended or adjusted under 35 U.S.C. 154(b) by 463 days.

(21) Appl. No.: 10/996,192

(22) Filed: Nov. 22, 2004

(65) Prior Publication Data

US 2005/0152482 A1    Jul. 14, 2005

Related U.S. Application Data

(63) Continuation of application No. PCT/BE03/00091, filed on May 22, 2003.

(30) Foreign Application Priority Data

May 8, 2003    (EP) .................................. 03447107

(51) Int. Cl.
    *H04L 27/00*    (2006.01)
    *H04L 27/06*    (2006.01)
    *H04B 1/26*     (2006.01)
(52) U.S. Cl. ...................... 375/316; 375/326; 375/345; 455/324
(58) Field of Classification Search ................ 375/316, 375/326, 345; 455/324
    See application file for complete search history.

(56) References Cited

U.S. PATENT DOCUMENTS 5,872,538 A    2/1999    Fowler
6,009,317 A    12/1999   Wynn
7,020,226 B1 * 3/2006    Kirkland .................... 375/355
7,076,008 B2 * 7/2006    Jeong ........................ 375/345

(Continued)

FOREIGN PATENT DOCUMENTS

EP       1 130 866 A    9/2001

(Continued)

OTHER PUBLICATIONS

Tubbox et al., "Compensation of IQ Imbalance and Phase Noise in OFDM System," IEE Transaction on wireless communication, vol. 4, No. 3, May 2005, pp. 872-877.*

(Continued)

*Primary Examiner*—Tesfaldet Bocure
(74) *Attorney, Agent, or Firm*—Knobbe Martens Olson & Bear LLP (57) ABSTRACT

A method of determining IQ imbalance introduced on an RF multicarrier signal received via a channel on a direct conversion analog receiver is disclosed. In one embodiment, the method comprises i) receiving a training signal on the receiver, ii) demodulating the training signal on the receiver, iii) estimating a first frequency domain channel characteristic of the channel based on the demodulated training signal, iv) defining a predetermined relationship between a corrected frequency domain channel characteristic of the channel and the first channel characteristic, the predetermined relationship comprising at least one IQ imbalance parameter, and v) determining the at least one IQ imbalance parameter such that the corrected channel characteristic satisfies a channel constraint.

34 Claims, 7 Drawing Sheets

U.S. PATENT DOCUMENTS

| | | |
|---|---|---|
| 7,076,225 B2 * | 7/2006 | Li et al. .................. 455/245.1 |
| 7,167,513 B2 * | 1/2007 | Tsui et al. .................. 375/229 |
| 7,251,291 B1 * | 7/2007 | Dubuc et al. ............... 375/296 |
| 2002/0009162 A1 * | 1/2002 | Camp et al. ................ 375/329 |
| 2003/0231726 A1 * | 12/2003 | Schuchert et al. .......... 375/350 |

FOREIGN PATENT DOCUMENTS

| | | |
|---|---|---|
| WO | WO 99/57820 | 11/1999 |
| WO | WO 003686 A1 | 1/2003 |

OTHER PUBLICATIONS

Valenti, "A Bandwidth Efficient Pilot Symbol Technique for Coherent Detection of Turbo Codes over Fading Channels", (1999) IEEE pp. 81-85.

Ma et al., "Analysis of IQ Imbalance on Initial Frequency Offset Estimation in Direct Down-Conversion Receivers", (2001) IEEE pp. 158-161.

* cited by examiner

METHOD AND SYSTEM FOR ESTIMATING AND COMPENSATING IQ IMBALANCE

RELATED APPLICATIONS

This application is a continuation application, and claims the benefit under 35 U.S.C. §§ 120 and 365 of PCT Application No. PCT/BE03/00091, filed on May 22, 2003 and published Dec. 4, 2003, in English, which is hereby incorporated by reference.

BACKGROUND OF THE INVENTION

1. Field of the Invention

The present invention relates to a method and device for estimating and compensating the IQ imbalance which is introduced on an RF multicarrier signal received via a channel on a direct conversion analog receiver, for example, a zero-IF receiver.

2. Description of the Related Technology

A method for detecting and correcting IQ imbalance in a direct conversion receiver is known from WO-A-03/003686 (published after the earliest priority date of this application). A group of radio frequency (RF) pilot signals are received in the direct conversion receiver and conveyed to an in-phase (I) branch and a quadrature-phase (Q) branch of the receiver. The signals on the in-phase and quadrature-phase branches are mixed in the analogue domain to form baseband in-phase and quadrature-phase signal components. In the digital domain, IQ-imbalance in the pilot signals is detected by averaging the Q-component over a number of consecutive pilot signals. On the basis of the averaged Q-component, which represents an estimate of the IQ-imbalance, a correction signal is created which is fed back to the analogue domain for correcting the future baseband signal components to achieve a 90° phase difference.

The method known from WO-A-03/003686 has the disadvantage that the detection of IQ-imbalance by averaging over a plurality of consecutive pilot signals is too slow for extensive data transmission. Furthermore, the method known from WO-A-03/003686 only compensates IQ phase imbalance, not IQ amplitude imbalance.

SUMMARY OF CERTAIN INVENTIVE ASPECTS OF THE INVENTION

One aspect of the invention provides a faster method for determining IQ imbalance.

Another aspect of the invention provides a method of determining at least one IQ imbalance parameter indicative of the IQ imbalance introduced on the RF multicarrier signal. This RF signal comprises a training or pilot signal and a data signal, which contains the actual data to be transmitted. From the training signal, a first frequency domain channel characteristic of the transmission channel is estimated. A predetermined relationship is defined between a corrected frequency domain channel characteristic of the transmission channel and the estimated first channel characteristic. This relationship comprises the at least one IQ parameter to be determined, so that the relationship takes the IQ imbalance of the first channel characteristic into account. In one embodiment, the IQ parameter is determined in such a way on the basis of the relationship between the first and the corrected channel characteristics, that the corrected channel characteristic meets a channel constraint.

In one embodiment, the method uses the information that the transmission channel does not have an arbitrary channel characteristic in the frequency domain, but that this channel is subjected to a given constraint. This constraint is used to determine the at least one IQ imbalance parameter, in fact while correcting the first channel characteristic to the corrected channel characteristic. As a result, the IQ imbalance parameter is in fact simultaneously determined with the corrected channel characteristic, substantially in a single step, so that a faster method for determining the IQ imbalance is achieved. Furthermore, one embodiment of the invention can surprisingly sustain large IQ imbalance without leading to too much degradation. Furthermore, in one embodiment, both phase and amplitude IQ imbalance can be determined and hence compensated.

In one embodiment, the channel constraint is that the corrected channel characteristic should be smoother than the estimated, first channel characteristic. The information which is used here is that the IQ imbalance leads to sharp transitions in the estimated or measured frequency domain channel characteristic, whereas in reality the channel characteristic is substantially smooth. As a result, correcting the channel characteristic for IQ imbalance means reducing the sharp transitions in the channel characteristic. Any other channel constraint may however also be used according to embodiments of the invention for determining the IQ imbalance parameter.

In one embodiment, the feature that the channel characteristic is smooth can represent that the channel has a coherence bandwidth which is (a lot) larger than the inter-carrier spacing of the channel. According to this definition, smoothening the channel characteristic means to increase the coherence bandwidth.

From the above, it can be derived that the corrected channel characteristic is preferably as smooth as possible. This channel constraint can be achieved according to one embodiment of the invention minimizing an error norm, for example, the mean square error (MSE), between consecutive channel coefficients of the channel characteristic.

In a preferred embodiment, the presence of a carrier frequency offset (CFO) on the RF signal is taken into account. The problem of carrier frequency offset is known in the art and results from a frequency difference between the local oscillators on the transmitter and receiver sides. It is however unknown to determine IQ imbalance in the presence of CFO.

According to a first preferred embodiment of the invention, a method for determining IQ imbalance in the presence of CFO is proposed, which comprises the following steps. A carrier frequency offset is first determined from the demodulated training signal. The determined frequency offset is equivalent to a compensation phase, which is used to rotate the training signal twice, one time in forwards direction and one time in reverse direction, so that a forwards and a reverse rotated training signal are obtained. Both training signals are then used to determine a channel characteristic. Both these channel characteristics are used, in a similar way as has been described above, to obtain a corrected channel characteristic, which is defined by means of a predetermined relationship towards the two channel characteristics. As above, this relationship comprises the at least one IQ imbalance parameter, which is determined in such a way that the corrected channel characteristic fulfils the channel constraint.

In another embodiment, the CFO is taken into account using the information that in the frequency domain the CFO leads to inter-carrier interference. In this embodiment, inter-carrier interference parameters are determined from the CFO estimate which is determined from the training signal and these parameters are taken into account in the predetermined relationship between the estimated, first channel characteristic and the corrected channel characteristic.

In another aspect of the invention, at least one IQ imbalance parameter is determined by estimation in the time domain. In this aspect, the method uses the information that the training signal comprises at least two consecutive long training symbols (LTS), which are transmitted as equal symbols but may be received as different symbols. In order to take the mismatch introduced by the channel and/or the receiver end into account, a first predetermined relationship is defined between a first corrected LTS and a first of the received LTS's and a second predetermined relationship is defined between a second corrected LTS and a second of the received LTS's. Both relationships comprise at least one IQ imbalance parameter, for taking IQ imbalance into account. The second relationship further comprises a CFO compensation for taking the CFO into account, which is determined by means of the training signal. The IQ imbalance parameter (s) are in this case determined using the information that the two LTS's originally were equal symbols, so by minimizing the difference between the first corrected LTS and the second corrected LTS.

Both aspects of the invention, namely the frequency domain as well as the time domain IQ imbalance determination may also be combined into a selective method, in which the one or the other is used and the selection is based on the CFO. This combined method has the advantage that a low complexity scheme for compensating IQ imbalance can be designed.

Another aspect of the invention provides methods for compensating IQ imbalance and optionally CFO, using one or more of the above described methods for determining the IQ imbalance and the CFO. Still another aspect of the invention provides devices for implementing these methods, a wireless system comprising such device and a data carrier on which a program of instructions for performing one of these methods is stored.

In summary, various embodiments of the invention enable low-complexity estimation/compensation schemes for tackling the IQ imbalance caused by direct conversion analog receivers. One embodiment of the invention makes it possible to design schemes which converge on one OFDM training symbol. Another embodiment of the invention makes it possible to remove large IQ imbalance ($\epsilon$=10%, $\Delta\phi$=10°) and reduce the average remaining degradation down to 0.5 dB, even in the presence of large frequency offsets. As a result, the IQ mismatch specifications for the receivers can be significantly relaxed, so that cheaper components can be used and the design time can be shortened. In other words, low-cost and low-complexity OFDM receivers can be designed by means of embodiments of the invention, making the method very suitable for implementation in WLAN systems.

BRIEF DESCRIPTION OF THE DRAWINGS

Various embodiments of the invention will be further described by means of the following description and the appended figures.

DETAILED DESCRIPTION OF CERTAIN EMBODIMENTS OF THE INVENTION

First, the model which is used in the method for determining IQ imbalance according to one embodiment of the invention, the effect of IQ imbalance on OFDM and a compensation scheme for a no-or-low frequency offset scenario are explained.

As used herein, frequency domain signals are underscored, while time domain signals are not. Signals are indicated in bold font and scalar parameters in normal font.

IQ imbalance can be characterised by two parameters: the amplitude imbalance $\epsilon$ between the I and Q branch, and the phase orthogonality mismatch $\Delta\phi$. The complex baseband equation for the IQ imbalance effect on the ideal time domain signal r is given by $$r_{iq} = (1+\epsilon)\cos\Delta\Phi \cdot \mathcal{R}\{r\} - (1+\epsilon)\sin\Delta\Phi \cdot \mathcal{I}\{r\} + \quad (1)$$
$$j[(1-\epsilon)\cos\Delta\phi \cdot \mathcal{I}\{r\} - (1+\epsilon)\sin\Delta\phi \cdot \mathcal{R}\{r\}],$$
$$= \cos\Delta\phi + j\epsilon\sin\Delta\phi \cdot r + (\epsilon\cos\Delta\phi - j\sin\Delta\phi)\cdot r^* = \alpha \cdot r + \beta \cdot r^* \quad (2)$$

wherein $r_{iq}$ is the time domain signal with IQ imbalance, $\mathcal{R}(\ )$ denotes the real part, $\mathcal{I}(\ )$ the imaginary part and $(\ )^*$ the complex conjugate and $$\alpha = \cos\Delta\phi + j\epsilon\sin\Delta\phi \quad (3)$$

$$\beta = \epsilon\cos\Delta\phi - j\sin\Delta\phi \quad (4)$$

As used herein, the term IQ imbalance parameters refers to $\alpha$ and $\beta$ for calculations and estimations. To indicate physical parameters, however, the more direct $\epsilon$ and $\Delta\phi$ are used.

Next, the effect of the IQ imbalance in the frequency domain is analysed. If d is the incoming OFDM symbol (thus d=$d_t$.c+n with $d_t$ the transmitted OFDM symbol, c the channel and n the noise), then IFFT(d) is the corresponding time domain signal. Applying the IQ imbalance (2) and taking the FFT to convert back to the frequency domain leads to $$\underline{d}_{iq} = FFT\{\alpha \cdot IFFT(\underline{d}) + \beta \cdot [IFFT(\underline{d})]^*\} = \alpha \cdot \underline{d} + \beta \cdot \underline{d}_m^* \quad (5)$$

wherein $\underline{d}_{iq}$ is the OFDM symbol with IQ imbalance and $\underline{d}_m$ the incoming OFDM symbol, mirrored over the carriers: $d_{m(i)}=d_{(mod(Nsc-i+2,Nsc))}$, with $N_{sc}$ the number of sub-carriers in the OFDM symbol, $1 \leq i \leq N_{sc}$ and mod the modulo operation. Carrier 1 is the DC carrier.

Herein, the focus is on IQ compensation for bursty communication, for which channel estimation is performed on the basis of a known training symbol. Both IEEE802.11a and HIPERLAN-II provide such a Long Training Symbol (LTS) (symbol t). The effect of IQ imbalance on channel estimation can be calculated based on (5). For the moment, the noise is ignored; its effect is taken into account for the performance analysis. The calculation leads to $$\underline{h} = t \cdot [\alpha(t \cdot \underline{c}) + \beta(t \cdot \underline{c})_m^*] = \alpha \cdot \underline{c} + \beta \cdot t' \cdot \underline{c}_m^* \quad (6)$$

wherein h is the channel estimate calculated from the LTS, c is the exact channel vector and $t' = t \cdot t_m$.

As a result, h is a first channel characteristic, which is determined on the basis of the training signal, more particularly the LTS. This first channel characteristic is now used for determining a corrected channel characteristic ĉ, which can be derived from (6) and defined as $$\hat{\underline{c}} = \frac{\alpha^* \underline{h} - \beta t' \cdot \underline{h}_m^*}{|\alpha|^2 - |\beta|^2} \quad (7)$$

Figure 1:
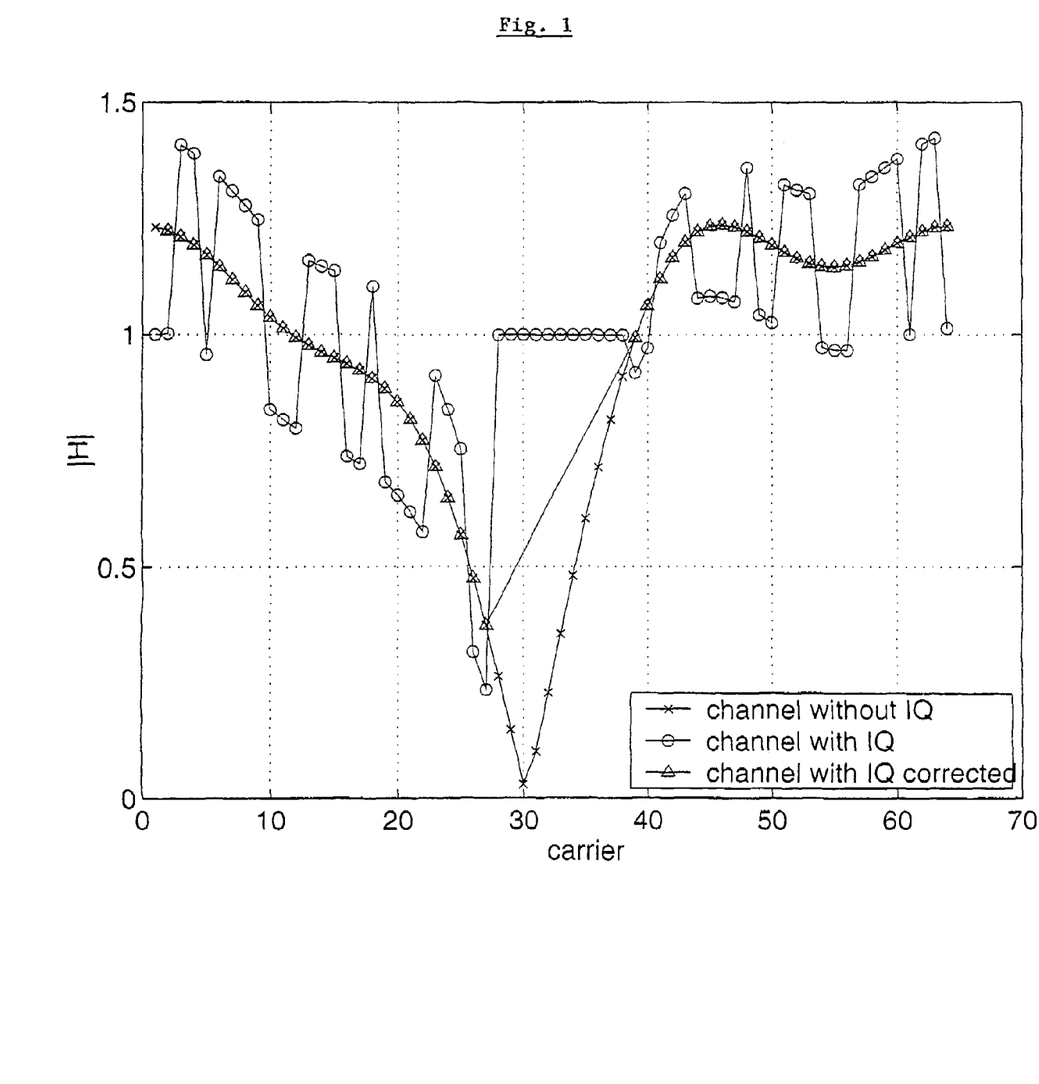
FIG. 1 shows the effect of IQ imbalance and correction on the estimated, first channel characteristic.

The estimation of α and β is based on the information that the corrected channel response should have a smooth channel characteristic: since the coherence bandwidth of the channel is (a lot) larger than the inter-carrier-spacing in a WLAN system, the channel response does not change substantially between successive frequency taps (the x-line in FIG. 1). With IQ imbalance, sharp transitions occur in the measured channel response h due to the β degradation term (the o-line in FIG. 1). Thus, correcting the IQ imbalance means making the channel response 'smooth' again. To this end, the set of IQ imbalance parameters (α,β) is determined which renders the corrected channel characteristic ĉ as smooth as possible. This can for example be done by minimizing the Mean Square Error (MSE) between consecutive channel coefficients $$MSE = \sum_i |\hat{c}_{i+1} - \hat{c}_i|^2 \quad (8)$$

The derivation results in $$\hat{\beta} = \frac{\sum_i (h_{i+1} - h_i)((t'_{-i-1} h_{-i-1} - t'_{-i} h_{-i})}{\sum_i |(t'_{-i-1} h_{-i-1} - t'_{-i} h_{-i})|^2} \quad (9)$$

$$\hat{\alpha} = \sqrt{1 - \mathcal{I}^2\{\hat{\beta}\}} - j \frac{\mathcal{R}\{\hat{\beta}\}\mathcal{I}\{\hat{\beta}\}}{\sqrt{1 - \mathcal{I}^2\{\hat{\beta}\}}} \quad (10)$$

In order to reduce complexity, α can be approximated in first order by:

$$\hat{\alpha} = \frac{\mathcal{I}^2\{\hat{\beta}\}}{2} - j \frac{\mathcal{R}\{\hat{\beta}\}\mathcal{I}\{\hat{\beta}\}}{1 - \frac{\mathcal{I}^2\{\hat{\beta}\}}{2}} \quad (11)$$

FIG. 1 shows that the influence of the IQ imbalance on the first channel characteristic can be corrected extremely well: the corrected channel characteristic (the Δ-line) coincides (almost) perfectly with the exact channel response (the x-line). Note that carriers 28 to 38 are zero carriers, which means no channel estimation is needed on those carriers.

As a result, the above described algorithm provides a corrected channel characteristic and an estimate of the IQ parameters α and β (or equivalently ε and Δφ). Since ε and Δφ and thus α and β are typically static over many symbols, their estimates from the channel correction on the training signal can also be used for the correction of the IQ imbalance on the data signal. Furthermore, the estimate of the IQ imbalance parameters is already provided before the data symbols arrive, so that the effect can be compensated in the time domain, i.e., before the FFT. This makes it possible to correct the IQ imbalance at a very early stage.

To obtain the corrected, IQ compensated signal ř from the observed time domain signal $r_{iq}$, equation (2) is solved for r, i.e., $$\hat{r} = \frac{\alpha \cdot r_{iq} - \beta \cdot r_{iq}^*}{|\alpha|^2 - |\beta|^2} \quad (12)$$

Since the above described algorithm is based on a frequency-domain estimation of the IQ parameters, it is herein shortly referred to as the 'IQ-Frequency Domain' or IQ-FD algorithm.

Figure 2:
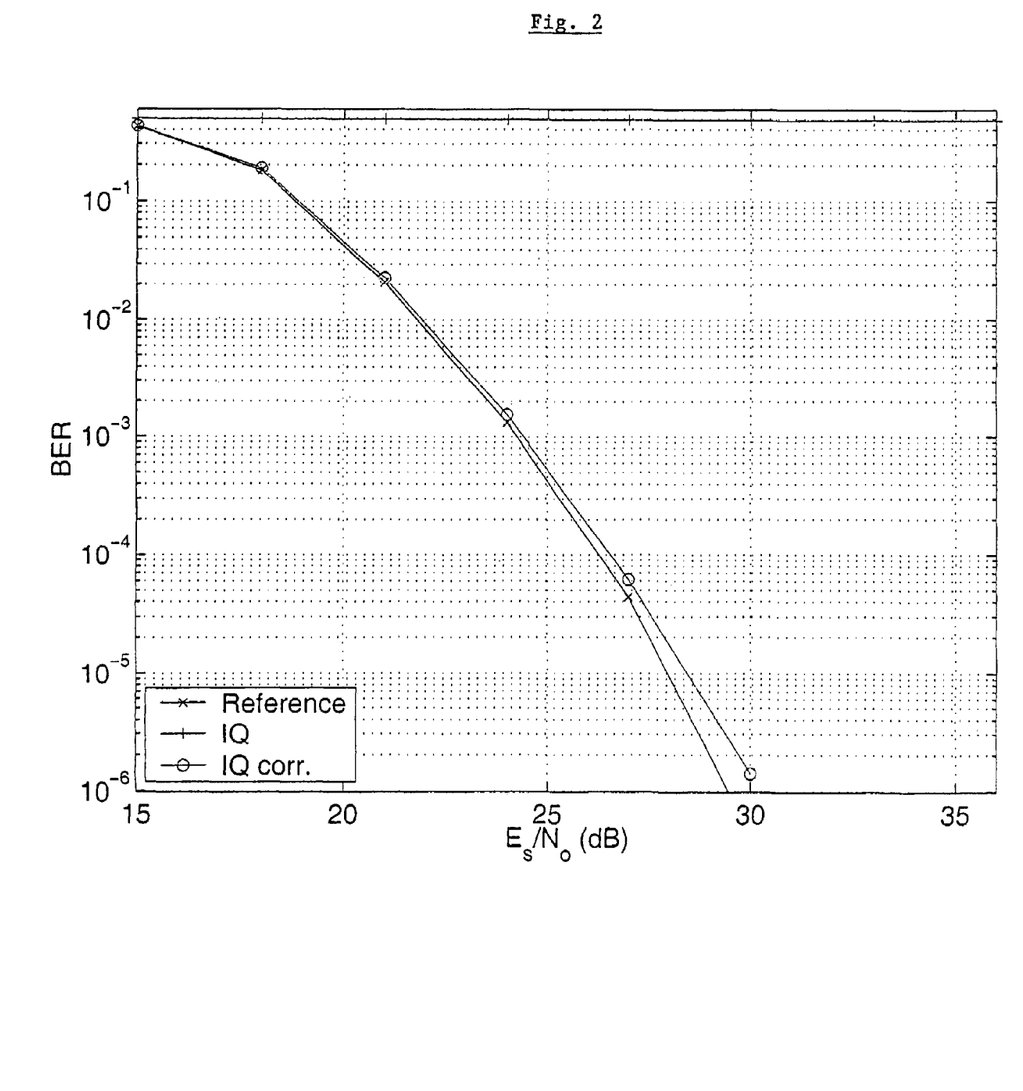
FIG. 2 shows the correction of IQ imbalance based on channel estimation for coded 64 QAM.

To test the performance of the IQ-FD estimation/compensation scheme, simulations were performed for coded 64 QAM in a multi-path environment. The multi-path channels are obtained through ray-tracing simulations. The impact of severe IQ imbalance (ε=10%,Δφ=10°) on coded (R=¾ from the IEEE or HIPERLAN standard) 64 QAM transmission is quite dramatic: it renders the system useless, causing an error floor of $5.10^{-1}$. However, the combined scheme of channel and IQ-FD estimation/compensation reduces the degradation at a BER of $10^{-5}$ down to 0.5 dB (FIG. 2). This shows the efficiency of the IQ-FD algorithm, at least at no or low CFO.

Figure 4:
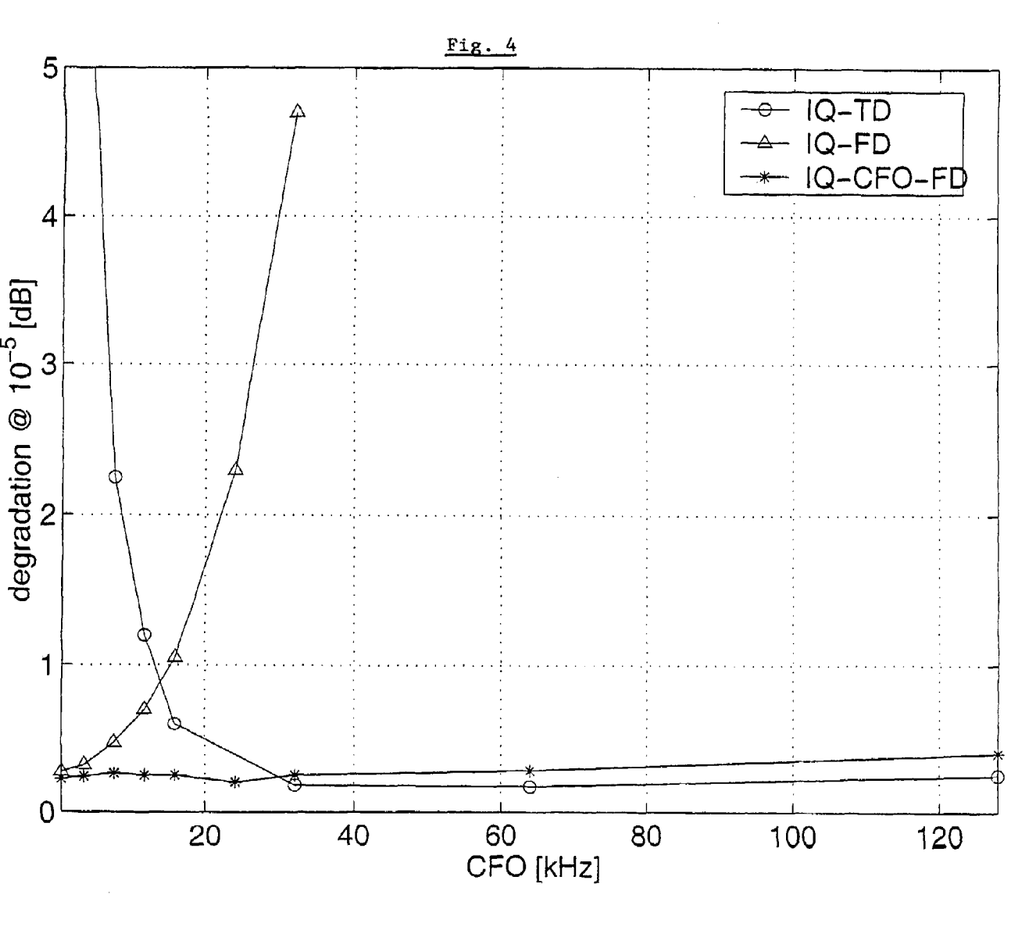
FIG. 4 shows the degradation for three preferred algorithms for compensating IQ imbalance according to one embodiment of the invention.

As can be seen in FIG. 4, a frequency offset causes the performance of IQ-FD algorithm to drop drastically. FIG. 4 shows that the degradation at a BER of $10^{-5}$ for coded 64 QAM already exceeds 1 dB of degradation at a CFO of 20 kHz and exceeds 5 dB at 40 kHz. In practice, the CFO can easily exceed 40 kHz.

One embodiment of the invention for estimating IQ imbalance in the presence of a frequency offset is described.

In the time domain a Carrier Frequency Offset (CFO) causes an additional phase rotation between consecutive samples of $CFO \cdot T_s$, with $T_s$ the sample time. In the frequency domain, a frequency offset causes leakage. This means that an OFDM symbol d is received under a frequency offset as $$(\underline{d}_{cfo})_i = \sum_{j=0}^{N_{sc}-1} \underline{d}_j \cdot \gamma_{i-j} \quad (13)$$

wherein γ is the inter-carrier-interference caused by the CFO:

$$\gamma_n = e^{j\pi\left(\frac{CFO}{\Delta f}-n\right)} \frac{\sin\pi\left(\frac{CFO}{\Delta f}-n\right)}{\sin\frac{\pi}{N_{sc}}\left(\frac{CFO}{\Delta f}-n\right)} \quad (14)$$

wherein $\Delta f$ is the inter-carrier-spacing and $N_{sc}$ the total number of carriers in the system.

Mathematical analysis of the RF signals shows that the effect of the IQ imbalance and CFO can be modelled at baseband by first applying the frequency offset, followed by the IQ imbalance. An IQ compensation scheme is derived according to the same principles used above, leading to the IQ-FD algorithm, but now the frequency offset is taken into account.

The CFO is estimated and compensated in the time domain. An algorithm is developed based on a scenario where the signal first experiences a frequency offset CFO, then an IQ imbalance $(\alpha,\beta)$ and then a frequency correction of $-CFO$. This assumes there is perfect frequency estimation, i.e. the frequency estimate is not disturbed by the IQ imbalance. This assumption and its effect are verified later.

The effect of IQ imbalance on channel estimation in the presence of CFO can be described as follows $$\underline{h}_i = \alpha \cdot \underline{c}_i + \beta t_i \sum_{j=0}^{N_{sc}-1} t_j \cdot \underline{c}^*_{-j} \cdot \eta_{j-i} \quad (15)$$

wherein $$\eta_{j-i} = \sum_{n=0}^{N_{sc}-1} \gamma^*_{i-n} \cdot \gamma^*_{n-j} \quad (16)$$

As a result, not only the exact mirror carrier $-i$ affects a certain carrier $i$, but also the carriers around $-i$ because of the leakage effect of the CFO. Equation (15) reduces to (6) if no CFO is present ($\eta_{j-i}=\delta(j-i)$).

Solving (15) for c leads to an estimate of the correct channel:

$$\hat{\underline{c}}_i = \frac{\alpha^*\underline{h}_i + \beta t_i \sum_{j=0}^{N_{sc}-1} t_j \cdot \underline{h}^*_{-j}\eta_{j-i}}{|\alpha|^2 - |\beta|^2} \quad (17)$$

Again as for IQ-FD algorithm, the $\alpha$ and $\beta$ are desired which yield the smoothest corrected channel characteristic ĉ. This leads to the following estimate for $\beta$:

$$\hat{\beta} = \frac{\sum_l (\underline{h}_{l+1} - \underline{h}_l) \cdot z_l}{\sum_l z_l\|^2} \quad (18)$$

wherein $$z_l = t_{l+1}\sum_{j=0}^{N_{sc}-1} t_{-j}\underline{h}^*_{-j}\eta_{j-l-1} - t_l\sum_{j=0}^{N_{sc}-1} t_{-j}\underline{h}^*_{-j}\eta_{j-l} \quad (19)$$

Again, this estimation of $\beta$ reduces to (9) if no CFO is present. $\alpha$ is derived from $\beta$ through (10) or (11).

Since the estimation of the IQ parameters in the presence of the frequency offset is performed in the frequency domain, this algorithm is referred to as the IQ-CFO-FD algorithm.

The *-line in FIG. 4 shows that the IQ-CFO-FD algorithm works even for large frequency offsets: the degradation does not exceed 0.5 dB at a BER of $10^{-5}$ coded 64 QAM for frequency offsets up to 128 kHz.

In practice, the CFO can be estimated by means of the average phase rotation between the 2 LTS sequences $$\hat{CFO} = \frac{E[\text{angle}(x_2 \cdot x_1^*)]}{2\pi N_{sc}T_s} \quad (20)$$

wherein $x_1$ and $x_2$ are the received training sequences and $N_{sc}T_s$ is the time between 2 corresponding samples of the training sequences. This CFO estimation performs well in the presence of IQ imbalance: the simulation results from FIG. 4 are based on the CFO estimates and show that the estimates are accurate enough to produce only a small residual degradation in the IQ imbalance estimation/compensation.

It is clear that IQ-CFO-FD algorithm is a more complex solution as opposed to the IQ-FD algorithm: for the computation of the corrected channel at 1 carrier, the measured channel h at all carriers is needed. This is due to the leakage caused by the frequency offset. For small frequency offsets, the leakage is limited, so that only a subset of all carriers is sufficient to compute the corrected channel at a certain carrier. However, for large frequency offsets, the leakage is large and all carriers are needed for the correction of each carrier.

Therefore, in the following, a first low-complexity algorithm as alternative for the IQ-CFO-FD algorithm is described.

The reason for the increased complexity of IQ-CFO-FD algorithm is the combination of CFO and a frequency domain estimation. In the frequency domain CFO is described by leakage (14): all carriers are linked to one another and no simple carrier-by-carrier description or estimation is possible. On the other hand, in the time domain a frequency offset causes a simple phase rotation, linearly increasing over all time samples, but there is no cross-sample-interference. Therefore, a frequency offset is more easily coped with in the time domain. Unfortunately, the channel is not known when we perform the IQ estimation based on the LTS. The only information present is in the frequency domain: because of a limited time domain channel response the frequency channel response varies smoothly from 1 carrier to the next. This is the basis of IQ-FD and IQ-CFO-FD algorithm.

Therefore, to perform IQ estimation in the time domain in the presence of a frequency offset, we need some extra information. Fortunately, both standards provide the transmission of not just 1 LTS, but of twice the same LTS. This allows us to use the first LTS as a reference and the second LTS is that reference but rotated according to the CFO. This idea is exploited in the next algorithm.

The Long Training Symbol t is transmitted twice and goes through the same multi-path channel. It is assumed that the channel does not change over 2 consecutive OFDM symbols. Since the channel is not known at the time of the IQ estimation, 2 identical, but unknown sequences $x_1=x_2$ arrive at the receiver. $x_1$ and $x_2$ are identical before they go through the front-end. In the front-end, with $x_1$ as a reference, $x_2$ undergoes a phase rotation CFOΔt, with CFO the frequency offset and Δt the time difference between corresponding samples of $x_1$ and $x_2$. Moreover, they both undergo an IQ imbalance (α,β). This means, in the digital domain, we receive $$y_1 = \alpha \cdot x_1 - \beta \cdot x_{1*} \tag{21}$$

$$y_2 = \alpha \cdot x_2 \cdot e^{jCFO\Delta t} - \beta \cdot x_2^* \cdot e^{-jCFO\Delta t} \tag{22}$$

The IQ imbalance (α,β) on the received $y_1$ can be corrected by applying (12) to obtain an estimate of $x_1$. Similarly, $y_2$ can be corrected by applying the same IQ imbalance and an additional frequency correction −CFO $$\hat{x}_1 = \frac{\alpha^* y_1 + \beta y_1^*}{|\alpha|^2 - |\beta|^2} \tag{23}$$

$$\hat{x}_2 = \frac{\alpha^* y_2 + \beta y_2^*}{|\alpha|^2 - |\beta|^2} \cdot e^{-jCFO\Delta t} \tag{24}$$

Since $x_1$ and $x_2$ are equal, the α and β are selected by means of which the difference between $\hat{x}_1$ and $\hat{x}_2$ is minimised, e.g. in a Mean-Squared Error sense:

$$MSE = \sum_{i=0}^{N_s-1} |(\hat{x}_1)_i - (\hat{x}_2)_i|^2 \tag{25}$$

with $N_s$ the number of samples taken into account. This leads to the following estimate for β:

$$\hat{\beta} = \frac{\sum_i ((y_2)_i \cdot e^{-jCFO\Delta t} - (y_1)_i)((y_2)_i \cdot e^{-jCFO\Delta t} - (y_1)_i)}{\sum_i |(y_2)_i \cdot e^{-jCFO\Delta t} - (y_1)_i|^2} \tag{26}$$

Since the estimation of the IQ parameters is performed in the time domain we refer to this algorithm as the 'IQ Time Domain' or IQ-TD algorithm.

The performance of this IQ-TD estimation/compensation scheme in the simulation of coded (R=¾) 64 QAM is depicted in FIG. 4 by the o-line. The IQ-TD algorithm performs very well for high CFO where the remaining degradation is about 0.5 dB, but poorly for low CFO (<15 kHz) where the degradation quickly rises. At low CFO, the difference between the two received training symbols $x_1$ and $x_2$ becomes small and the β estimate (26) becomes noise dominated and diverges from the real β.

Figure 3:
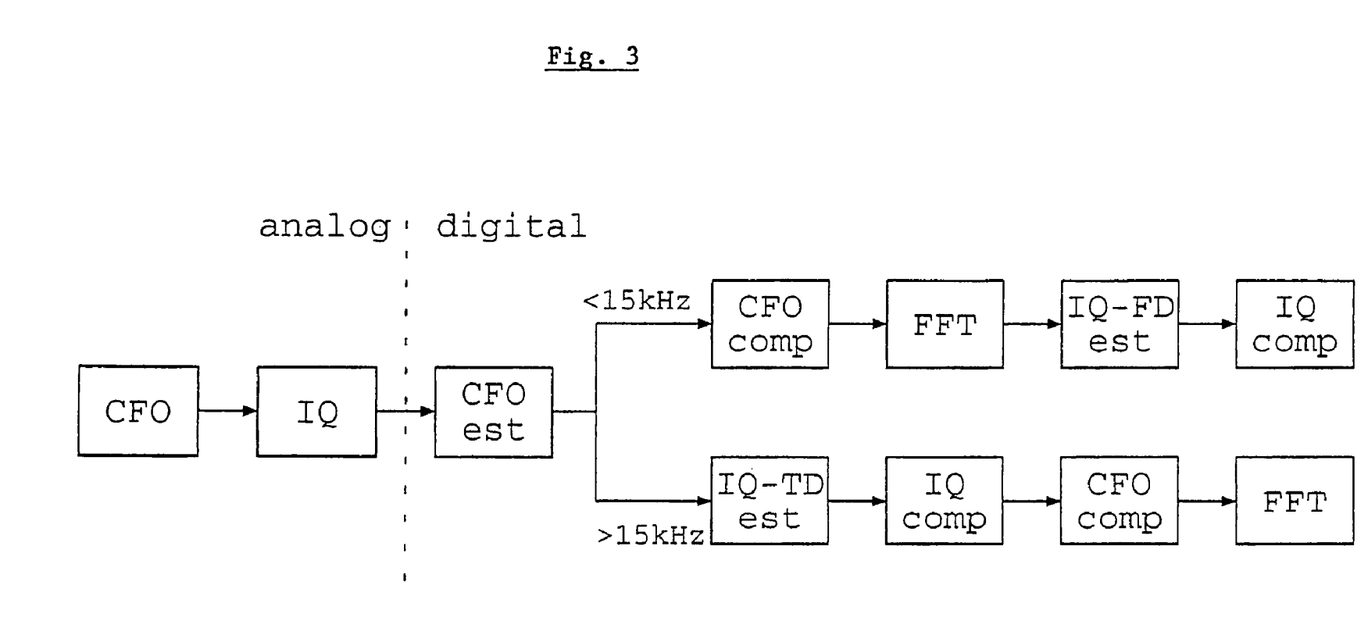
FIG. 3 shows a preferred scheme according to one embodiment of the invention for joint IQ and CFO estimation/compensation.

FIG. 3 shows that a first low-complexity embodiment for joint estimation/compensation of IQ imbalance and CFO is formed by the combination of the IQ-FD algorithm for small CFO and the IQ-TD for large CFO. This combination forms a first alternative for the IQ-CFO-FD algorithm, which reduces the remaining degradation below 0.5 dB over the entire frequency range, but has its large complexity as major drawback.

The switching point between the IQ-FD and IQ-TD algorithms is ideally around the trigger value of 15 kHz, where the o- and Δ-lines intersect. The overall remaining degradation is as low as for IQ-CFO-FD algorithm, except for a region around the 15 kHz switching point, where the peak degradation is still below 1 dB. The combination of IQ-FD and IQ-TD algorithms is therefore a very good alternative to the complex IQ-CFO-FD algorithm: it offers comparable performance at much lower complexity. The system overview for this alternative is in shown in FIG. 3.

There is an intuitive explanation for the existence of this switching point. If the frequency offset is large enough to have an impact on the performance, it is large enough to cause a measurable difference between the received training symbols $x_1$ and $x_2$, in which case the IQ-TD algorithm is used. The difference cannot be measured, if the impact of the frequency offset is too small. But then the impact on the performance is also small and the IQ-FD algorithm can be used.

In the following, a second low-complexity algorithm as alternative for the IQ-CFO-FD algorithm is described.

Figure 5:
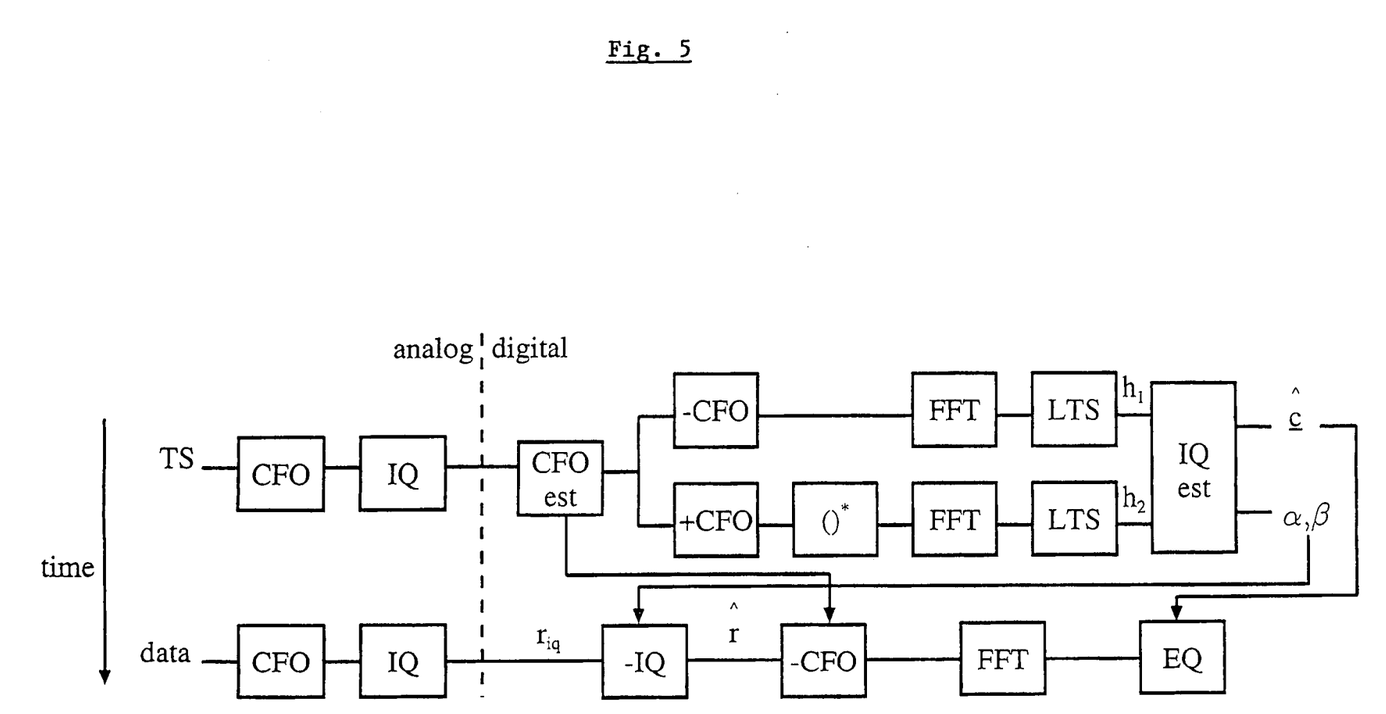
FIG. 5 shows another preferred scheme according to one embodiment of the invention for joint IQ and CFO estimation/compensation.

The block diagram of this second low-complexity algorithm is shown in FIG. 5. A carrier frequency offset is first determined from the demodulated training signal. The determined frequency offset is equivalent to a compensation phase, which is used to rotate the training signal twice, one time in forwards direction (+CFO) and one time in reverse direction (−CFO), so that a forwards and a reverse rotated training signal are obtained. Both training signals are then used to determine a channel characteristic. Both these channel characteristics are used, in a similar way as has been described above, to obtain a corrected channel characteristic, which is defined by means of the following relationship:

$$\hat{c} = \frac{\alpha^* h_i - \beta h_2}{|\alpha|^2 - |\beta|^2} \tag{27}$$

wherein $h_1$ and $h_2$ are the forwards and reverse rotated training signals, i.e. the inputs of the IQ estimation block of FIG. 5.

In a similar way as above, the corrected channel characteristic ĉ is optimised by applying the smoothness constraint, leading to $$\hat{\beta} = \frac{\sum_l (h_{1,l+1} - h_{1,l})(h_{2,l+1} - h_{2,l})}{\sum_l |h_{2,l+1} - h_{2,l}|^2} \tag{28}$$

with (1,l+1) running over all pairs of consecutive non-zero carriers. Again, α is determined on the basis of β by means of (10) or (11).

Figure 6:
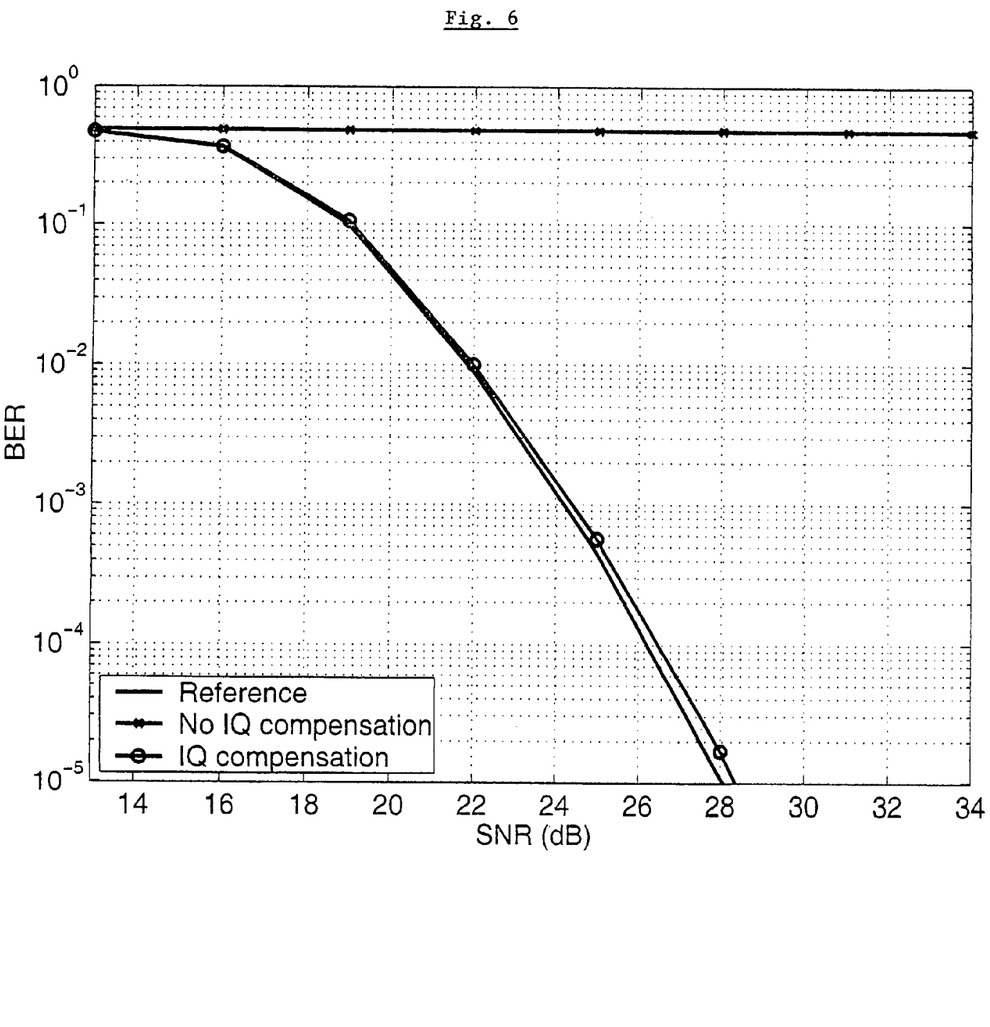
FIG. 6 shows the performance of the scheme of FIG. 5 for coded 64 QAM and ($\epsilon$=10%, $\Delta\phi$=10°) in the absence of a frequency offset.

The performance of this last compensation scheme is illustrated by means of FIG. 6 for a WLAN case study with coded (R=¾ from the IEEE or HIPERLAN standard) 64 QAM transmission. Even for large IQ imbalance (ε=10%, Δφ=10°), the IQ compensation reduces the degradation at a BER of $10^{-5}$ down to 0.25 dB.

Figure 7:
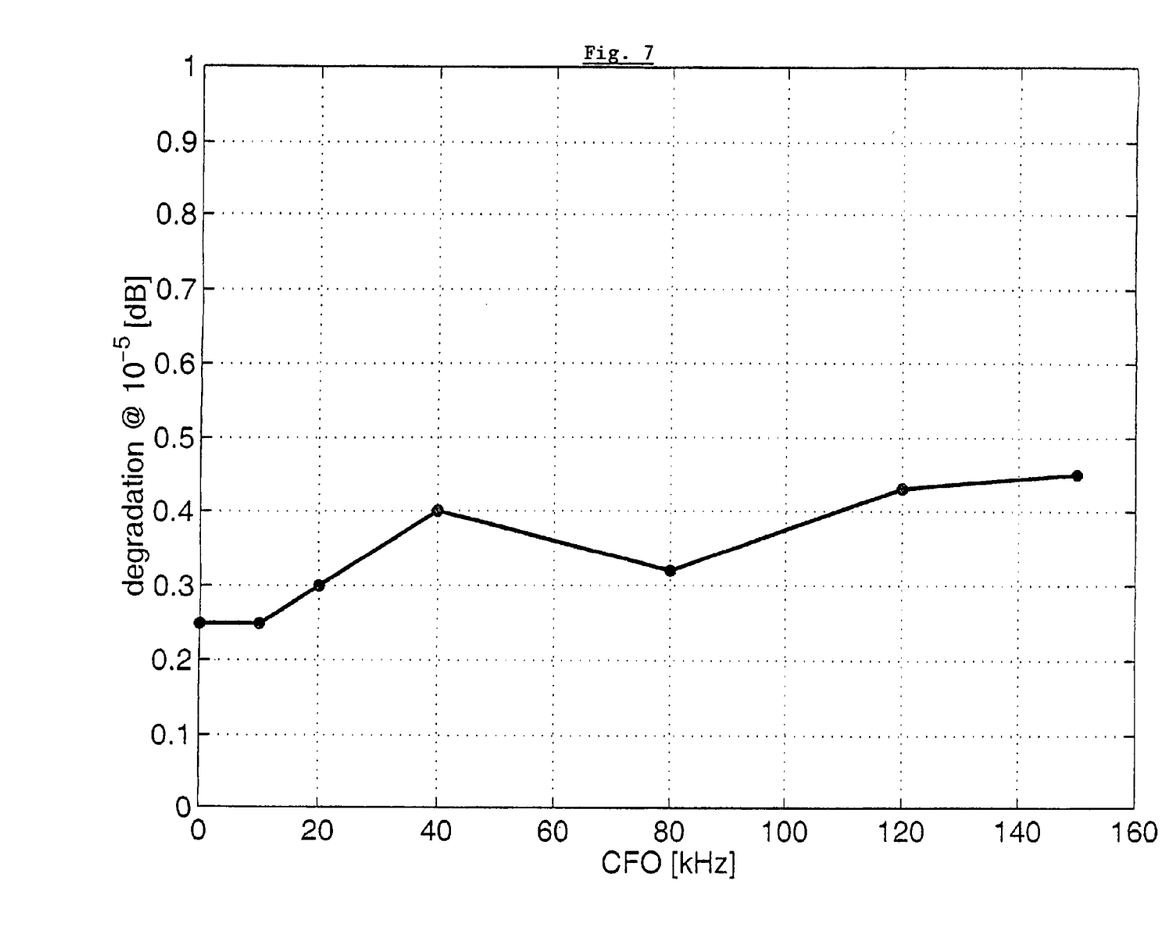
FIG. 7 shows for the scheme of FIG. 5 the degradation at $10^{-5}$ coded 64 QAM as a function of the frequency offset.

FIG. 7 illustrates that this last IQ compensation scheme works for large frequency offsets as well: the degradation does not exceed 0.5 dB at a BER of $10^{-5}$ coded 64 QAM even for frequency offsets exceeding 100 kHz.

This last IQ estimation/compensation algorithm requires no extra analog hardware and a very small additional digital complexity. The IQ imbalance may occur anywhere in the receiver, because the radio frequency (RF), local oscillator (LO) and baseband contributions are jointly estimated and compensated.

Since the IQ estimation only requires a known Training Symbol, this scheme is applicable to any system which uses a Training Symbol to estimate the channel (e.g. Wireless LAN and Broadband Fixed Wireless Access). Moreover, the scheme is also independent of the data that follows the Training Symbol. This means it is applicable to any constellation size and to OFDM as well as Single-Carrier with Frequency-Domain Processing.

Since the estimation is done in the frequency domain, it can be easily adapted to incorporate frequency-dependent IQ. In that case also the compensation is best handled in the frequency domain through a correction similar to (27).

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A method of determining IQ imbalance introduced on an RF multicarrier signal received via a channel on a direct conversion analog receiver, the method comprising:
   a) receiving a training signal on the receiver;
   b) demodulating the training signal on the receiver;
   c) estimating a first frequency domain channel characteristic of the channel based on the demodulated training signal;
   d) defining a predetermined relationship between a corrected frequency domain channel characteristic of the channel and the first channel characteristic, the predetermined relationship comprising at least one IQ imbalance parameter; and
   e) determining the at least one IQ imbalance parameter such that the corrected channel characteristic satisfies a channel constraint.

2. The method according to claim 1, wherein the channel constraint is that the corrected channel characteristic is smoother than the first channel characteristic.

3. The method according to claim 1, wherein the channel constraint is that the corrected channel characteristic has a larger coherence bandwidth than the first channel characteristic.

4. The method according to claim 1, wherein the channel constraint is that the corrected channel characteristic is as smooth as possible.

5. The method according to claim 1, wherein the corrected channel characteristic comprises a set of consecutive channel coefficients and that the at least one IQ imbalance parameter is determined by minimizing an error norm between the consecutive channel coefficients.

6. The method according to claim 5, wherein the error norm is the mean square error.

7. The method according to claim 1, wherein the predetermined relationship is defined as:

$$\hat{c} = \frac{\alpha^* \underline{h} - \beta t' \cdot \underline{h}_m^*}{|\alpha|^2 - |\beta|^2}$$

where:
h is the first channel characteristic,
ĉ is the corrected channel characteristic,
$t' = t \cdot t_m$ with t being the training signal,
α and β are the IQ imbalance parameters,
( )* is the complex conjugate, and
( )$_m$ is the mirror image.

8. The method according to claim 7, wherein the IQ imbalance parameters are determined by:

$$\hat{\beta} = \frac{\sum_l (h_{l+1} - h_l)(t'_{-l-1} h_{-l-1} - t'_{-l} h_{-l})}{\sum_l |t'_{-l-1} h_{-l-1} - t'_{-l} h_{-l}|^2}$$

and $$\hat{\alpha} = \sqrt{1 - \Im^2\{\hat{\beta}\}} - j\frac{\Re\{\hat{\beta}\}\Im\{\hat{\beta}\}}{\sqrt{1 - \Im^2\{\hat{\beta}\}}}$$

or $$\hat{\alpha} = 1 - \frac{\Im^2\{\hat{\beta}\}}{2} - j\frac{\Re\{\hat{\beta}\}\Im\{\hat{\beta}\}}{1 - \frac{\Im^2\{\hat{\beta}\}}{2}}$$

where $\Re( )$ denotes the real part and $\Im( )$ the imaginary part.

9. The method according to claim 1, further comprising:
   f) determining a carrier frequency offset estimate from the demodulated training signal;
   g) rotating the demodulated training signal over a compensation phase equivalent to the carrier frequency offset estimate, so as to obtain a forwards rotated training signal;
   h) determining the first channel characteristic from the forwards rotated training signal;
   i) inverse rotating the demodulated training signal over the compensation phase, so as to obtain an inverse rotated training signal; and
   j) determining a second channel characteristic from the inverse rotated training signal,
   wherein the predetermined relationship further comprises the second channel characteristic.

10. The method according to claim 9, wherein the predetermined relationship is defined as:

$$\hat{\underline{c}} = \frac{\alpha^* \underline{h}_1 - \beta \underline{h}_2}{|\alpha|^2 - |\beta|^2}$$

where:
$h_1$ is the first channel characteristic,
$h_2$ is the second channel characteristic,
ĉ is the corrected channel characteristic,
α and β are the IQ imbalance parameters, and
( )* is the complex conjugate.

11. The method according to claim 10, wherein the IQ imbalance parameters are determined by:

$$\hat{\beta} = \frac{\sum_l (h_{1,l+1} - h_{1,l})(h_{2,l+1} - h_{2,l})}{\sum_l |h_{2,l+1} - h_{2,l}|^2}$$

-continued and $$\hat{\alpha} = \sqrt{1 - \Im^2\{\hat{\beta}\}} - j\frac{\Re\{\hat{\beta}\}\Im\{\hat{\beta}\}}{\sqrt{1 - \Im^2\{\hat{\beta}\}}}$$

or $$\hat{\alpha} = 1 - \frac{\Im^2\{\hat{\beta}\}}{2} - j\frac{\Re\{\hat{\beta}\}\Im\{\hat{\beta}\}}{1 - \frac{\Im^2\{\hat{\beta}\}}{2}}$$

wherein $\Re( )$ denotes the real part and $\Im( )$ the imaginary part.

12. The method according to claim 1, further comprising:

f) determining a carrier frequency offset estimate from the demodulated training signal; and g) determining a plurality of inter-carrier interference parameters from the carrier frequency offset estimate, wherein the predetermined relationship further comprises the plurality of inter-carrier interference parameters.

13. The method according to claim 12, wherein the plurality of inter-carrier interference parameters are defined as:

$$\gamma_n = e^{j\pi\left(\frac{CFO}{\Delta f} - n\right)} \frac{\sin\pi\left(\frac{CFO}{\Delta f} - n\right)}{\sin\frac{\pi}{N_{sc}}\left(\frac{CFO}{\Delta f} - n\right)}$$

where:

$\gamma_n$ is the inter-carrier interference parameter of the $n^{th}$ carrier,

CFO is the carrier frequency offset estimate, $\Delta f$ is the inter-carrier spacing of the RF multicarrier signal, and $N_{sc}$ is the total number of carriers of the RB multicarrier signal.

14. The method according to claim 13, wherein the predetermined relationship is defined as:

$$\hat{c}_i = \frac{\alpha^* h_i + \beta t_i \sum_{j=0}^{N_{sc}-1} t_j h_{-j}^* \eta_{j-i}}{|\alpha|^2 - |\beta|^2} \text{ with}$$

$$\eta_{j-i} = \sum_{n=0}^{N_{sc}-1} \gamma_{i-n}^* \cdot \gamma_{n-j}^*$$

where:

$h_i$ is the $i^{th}$ coefficient of the first channel characteristic h, $\hat{c}$ is the $i^{th}$ coefficient of the corrected channel characteristic $\hat{c}$, $t_i$ is the $i^{th}$ coefficient of the training signal t, $\alpha$ and $\beta$ are the IQ imbalance parameters, and $( )^*$ is the complex conjugate.

15. The method according to claim 14, wherein the IQ imbalance parameters are determined by:

$$\hat{\beta} = \frac{\sum_l (h_{l+1} - h_l) \cdot z_l}{\sum_l \|z_l\|^2}$$

with $$z_l = t_{l+1} \sum_{j=0}^{N_{sc}-1} t_{-j} h_{-j} \eta_{j-l-1}^* - t_l \sum_{j=0}^{N_{sc}-1} t_{-j} h_{-j} \eta_{j-l}^*$$

and $$\hat{\alpha} = \sqrt{1 - \Im^2\{\hat{\beta}\}} - j\frac{\Re\{\hat{\beta}\}\Im\{\hat{\beta}\}}{\sqrt{1 - \Im^2\{\hat{\beta}\}}}$$

or $$\hat{\alpha} = 1 - \frac{\Im^2\{\hat{\beta}\}}{2} - j\frac{\Re\{\hat{\beta}\}\Im\{\hat{\beta}\}}{1 - \frac{\Im^2\{\hat{\beta}\}}{2}}$$

where $\Re( )$ denotes the real part and $\Im( )$ the imaginary part.

16. The method according to claim 1, wherein the method is selected for offsets less than a trigger value.

17. The method according to claim 16, wherein the trigger value is 15 kHz.

18. The method according to claim 1, further comprising compensating the received RF signal for IQ imbalance based on the at least one IQ imbalance parameter.

19. The method according to claim 18, further comprising equalizing the IQ compensated signal based on the corrected channel characteristic.

20. The method according to claim 1, wherein the at least one IQ imbalance parameter includes an IQ phase imbalance parameter and an IQ amplitude imbalance parameter.

21. A method of determining IQ imbalance introduced on an RF multicarrier signal received via a channel on a direct conversion analog receiver, the method comprising:

a) receiving a training signal on the receiver, the training signal comprising at least consecutive first and second LTS's (long training symbols) which have been transmitted as identical LTS's;

b) defining a first predetermined relationship between a first corrected LTS and the first received LTS, the first predetermined relationship comprising at least one IQ imbalance parameter;

c) defining a second predetermined relationship between a second corrected LTS and the second received LTS, the second predetermined relationship comprising the at least one IQ imbalance parameter and a carrier frequency offset compensation;

d) determining the carrier frequency offset compensation from the training signal; and e) determining the at least one IQ imbalance parameter by minimizing the difference between the first corrected LTS and the second corrected LTS according to the first and second predetermined relationships.

22. The method according to claim 21, wherein the first and second predetermined relationships are respectively defined as:

$$\hat{x}_1 = \frac{\alpha^* y_1 + \beta y_1^*}{|\alpha|^2 - |\beta|^2} \text{ and}$$

-continued $$\hat{x}_2 = \frac{\alpha^* y_2 + \beta y_1^*}{|\alpha|^2 - |\beta|^2} \cdot e^{-jCFO\Delta t}$$

where:
$\hat{x}_1$ is the first corrected LTS,
$\hat{x}_2$ is the second corrected LTS,
$y_1$ is the first received LTS,
$y_2$ is the second received LTS,
−CFO is the carrier frequency offset compensation,
α and β are the IQ imbalance parameters, and
( )* is the complex conjugate.

23. The method according to claim 22, wherein the IQ imbalance parameters are determined by:

$$\hat{\beta} = \frac{\sum_i ((y_2)_i \cdot e^{-jCFO\Delta t} - (y_1)_i)((y_2)_i \cdot e^{jCFO\Delta t} - (y_1)_i)}{\sum_i |(y_2)_i \cdot e^{jCFO\Delta t} - (y_1)_i|^2}$$

and $$\hat{\alpha} = \sqrt{1 - \Im^2\{\hat{\beta}\}} - j\frac{\Re\{\hat{\beta}\}\Im\{\hat{\beta}\}}{\sqrt{1 - \Im^2\{\hat{\beta}\}}}$$

or $$\hat{\alpha} = 1 - \frac{\Im^2\{\hat{\beta}\}}{2} - j\frac{\Re\{\hat{\beta}\}\Im\{\hat{\beta}\}}{1 - \frac{\Im^2\{\hat{\beta}\}}{2}}$$

where $\Re( )$ denotes the real part and $\Im( )$ the imaginary part.

24. The method according to claim 21, wherein the method is selected for offsets greater than a trigger value.

25. The method according to claim 24, wherein the trigger value is 15 kHz.

26. The method according to claim 21, further comprising compensating the received RE signal for IQ imbalance based on the at least one IQ imbalance parameter.

27. A method of determining IQ imbalance introduced on an RF multicarrier signal received via a channel on a direct conversion analog receiver, the method comprising:
a) receiving a training signal at the receiver;
b) determining a carrier frequency offset from the training signal; and
c) selecting, based on the carrier frequency offset, one of a first process and a second process,
wherein the first process includes:
demodulating the training signal on the receiver;
estimating a first frequency domain channel characteristic of the channel based on the demodulated training signal;
defining a predetermined relationship between a corrected frequency domain channel characteristic of the channel and the first channel characteristic, the predetermined relationship comprising at least one IQ imbalance parameter; and
determining the at least one IQ imbalance parameter such that the corrected channel characteristic satisfies a channel constraint,
and wherein the second process includes:
receiving a training signal on the receiver, the training signal comprising at least consecutive first and second LTS's (long training symbols) which have been transmitted as identical LTS's;
defining a first predetermined relationship between a first corrected LTS and the first received LTS, the first predetermined relationship comprising at least one IQ imbalance parameter;
defining a second predetermined relationship between a second corrected LTS and the second received LTS, the second predetermined relationship comprising the at least one IQ imbalance parameter and a carrier frequency offset compensation;
determining the carrier frequency offset compensation from the training signal; and
determining the at least one IQ imbalance parameter by minimizing the difference between the first corrected LTS and the second corrected LTS according to the first and second predetermined relationships.

28. The method according to claim 27, further comprising compensating the received RE signal for IQ imbalance based on the at least one IQ imbalance parameter.

29. A method of compensating IQ imbalance introduced on an RF multicarrier signal received via a channel on a direct conversion analog receiver, the method comprising:
a) determining at least one IQ imbalance parameter and a carrier frequency offset estimate by a process;
b) compensating the received RE signal for carrier frequency offset by means of the carrier frequency offset estimate; and
c) compensating the CFO compensated signal for IQ imbalance by means of the at least one IQ imbalance parameter,
wherein the process comprises:
receiving a training signal on the receiver, the training signal comprising at least consecutive first and second LTS's (long training symbols) which have been transmitted as identical LTS's;
defining a first predetermined relationship between a first corrected LTS and the first received LTS, the first predetermined relationship comprising at least one IQ imbalance parameter;
defining a second predetermined relationship between a second corrected LTS and the second received LTS, the second predetermined relationship comprising the at least one IQ imbalance parameter and a carrier frequency offset compensation;
determining the carrier frequency offset compensation from the training signal; and
determining the at least one IQ imbalance parameter by minimizing the difference between the first corrected LTS and the second corrected LTS according to the first and second predetermined relationships.

30. A system for determining IQ imbalance introduced on an RF multicarrier signal received via a channel on a direct conversion analog receiver, the system comprising:
means for receiving a training signal on the receiver;
means for demodulating the training signal on the receiver;
means for estimating a first frequency domain channel characteristic of the channel based on the demodulated training signal;
means for defining a predetermined relationship between a corrected frequency domain channel characteristic of the channel and the first channel characteristic, the predetermined relationship comprising at least one IQ imbalance parameter; and means for determining the at least one IQ imbalance parameter such that the corrected channel characteristic satisfies a channel constraint.

31. The system according to claim 30, wherein the system comprises at least one FFT block.

32. The system according to claim 30, wherein the system is for use with a wireless communication system.

33. The system according to claim 32, wherein the wireless communication system includes a wireless LAN and a broadband fixed wireless access system.

34. One or more processor readable storage devices having processor readable code embodied on the processor readable storage devices, the processor readable code for programming one or more processors to perform a method of determining IQ imbalance introduced on an RF multicarrier signal received via a channel on a direct conversion analog receiver, the method comprising:

receiving a training signal on the receiver;

demodulating the training signal on the receiver;

estimating a first frequency domain channel characteristic of the channel based on the demodulated training signal;

defining a predetermined relationship between a corrected frequency domain channel characteristic of the channel and the first channel characteristic, the predetermined relationship comprising at least one IQ imbalance parameter; and determining the at least one IQ imbalance parameter such that the corrected channel characteristic satisfies a channel constraint.

\* \* \* \* \*

UNITED STATES PATENT AND TRADEMARK OFFICE
CERTIFICATE OF CORRECTION

PATENT NO. : 7,313,203 B2  Page 1 of 1
APPLICATION NO. : 10/996192
DATED : December 25, 2007
INVENTOR(S) : Tbbax et al.

It is certified that error appears in the above-identified patent and that said Letters Patent is hereby corrected as shown below:

| Column | Line | Description of Error |
|---|---|---|
| First Page Col. 1 (Assignees Name) | 3 | Delete "Katholeike" and insert -- Katholieke --, therefor. |
| 5 | 57 | Delete "a" and insert -- $\alpha$ --, therefor. |
| 7 | 4 (Equation) | Delete "sinx" and insert -- sin --, therefor. |
| 13 | 22 | In Claim 12, delete "farther" and insert -- further --, therefor. |
| 13 | 42 | In Claim 13, delete "RIB" and insert -- RF --, therefor. |
| 16 | 19 | In Claim 28, delete "RE" and insert -- RF --, therefor. |
| 16 | 27 | In Claim 29, delete "RE" and insert -- RF --, therefor. |

Signed and Sealed this

Twenty-ninth Day of June, 2010

David J. Kappos
*Director of the United States Patent and Trademark Office*